United States Patent
Saban et al.

(10) Patent No.: US 8,366,971 B2
(45) Date of Patent: Feb. 5, 2013

(54) ADDITIVE FOR ROBUST METAL INK FORMULATIONS

(75) Inventors: Marko D. Saban, Etobicoke (CA); Yulin Wang, Oakville (CA); Mahya Mohktari, Scarborough (CA); Roger E. Gaynor, Oakville (CA); Yiliang Wu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 454 days.

(21) Appl. No.: 12/753,655

(22) Filed: Apr. 2, 2010

(65) Prior Publication Data

US 2011/0244117 A1  Oct. 6, 2011

(51) Int. Cl.
*H01B 1/22* (2006.01)
*B05D 5/12* (2006.01)

(52) U.S. Cl. ......................... 252/514; 427/96.1
(58) Field of Classification Search ............... 252/514; 427/96.1
See application file for complete search history.

(56) References Cited

U.S. PATENT DOCUMENTS

| 6,107,117 | A | 8/2000 | Bao et al. |
|---|---|---|---|
| 7,270,694 | B2 | 9/2007 | Li et al. |
| 7,674,403 | B2 * | 3/2010 | Kim ............................. 252/512 |
| 8,206,827 | B2 * | 6/2012 | Choate ...................... 428/423.1 |
| 2003/0136958 | A1 | 7/2003 | Ong et al. |
| 2003/0160230 | A1 | 8/2003 | Ong et al. |
| 2003/0160234 | A1 | 8/2003 | Ong et al. |
| 2007/0099357 | A1 | 5/2007 | Li et al. |
| 2008/0000382 | A1 | 1/2008 | Li et al. |
| 2008/0014343 | A1 * | 1/2008 | Cayton et al. .................. 427/189 |
| 2009/0148600 | A1 | 6/2009 | Li et al. |
| 2009/0181183 | A1 | 7/2009 | Li et al. |
| 2009/0274834 | A1 | 11/2009 | Chopra et al. |
| 2009/0301344 | A1 | 12/2009 | Chretien et al. |

FOREIGN PATENT DOCUMENTS

| EP | 1 591 497 | 2/2005 |
|---|---|---|
| JP | 2010284801 A * | 12/2010 |
| WO | WO 2007/033031 | 3/2007 |
| WO | WO 2008/113075 | 9/2008 |

OTHER PUBLICATIONS

U.S. Appl. No. 12/369,861, filed Feb. 12, 2009.
U.S. Appl. No. 12/331,573, filed Dec. 10, 2008.

* cited by examiner

*Primary Examiner* — Mark Kopec
(74) *Attorney, Agent, or Firm* — Oliff & Berridge, PLC

(57) ABSTRACT

A composition that may be an electronic circuit element includes a metal nanoparticle, a silicone modified polyacrylate compound and a solvent. The silicone modified polyacrylate compound may be a silicone modified polyacrylate compound with at least one organic functional moiety. A method of forming conductive features on a substrate includes depositing a composition containing metal nanoparticles, a silicone modified polyacrylate compound and a solvent onto a substrate, and heating the deposited composition to a temperature from about 100° C. to about 200° C.

20 Claims, No Drawings

ADDITIVE FOR ROBUST METAL INK FORMULATIONS

BACKGROUND

Fabrication of electronic circuit elements using liquid deposition techniques is of profound interest as such techniques provide potentially low-cost alternatives to conventional mainstream amorphous silicon technologies for electronic applications such as thin film transistors (TFTs), light-emitting diodes (LEDs), RFID tags, photovoltaics, and the like. However, the deposition and/or patterning of functional electrodes, pixel pads, and conductive traces, lines and tracks, which meet the conductivity, processing, and cost requirements for practical applications, have been a great challenge.

Solution-processable conductors are of great interest for use in such electronic applications. Metal nanoparticle-based inks represent a promising class of materials for printed electronics. However, most metal nanoparticles, such as silver and gold metal nanoparticles, require large molecular weight stabilizers to ensure proper solubility and stability in solution. These large molecular weight stabilizers inevitably raise the annealing temperatures of the metal nanoparticles above 200° C. in order to burn off the stabilizers, which temperatures are incompatible with most low-cost plastic substrates such as polyethylene terephthalate (PET) and polyethylene naphthalate (PEN) that the solution may be coated onto and can cause damage thereto.

Furthermore, current metal nanoparticle compositions when deposited on a substrate often result in conductive metal ink lines that are too wide, exhibit a low conductivity and have a "coffee ring effect". "Coffee ring effect" is referred to herein as the widening of a deposited metal ink line such that it displays a bimodal line profile (two peaks) in a surface profile measurement. The deposition of a conductive metal ink lines that exhibit a coffee ring effect and/or are otherwise too wide may limit their use in certain applications.

SUMMARY

There is a need, addressed by the subject matter described herein, for conductive metal nanoparticle compositions with improved conductivity and that do not exhibit a "coffee ring effect" upon deposition, for example, wherein the metal nanoparticle ink composition can be deposited with a sufficient width and thickness that is suitable for further processing.

The above and other issues are addressed by the present application, wherein in embodiments, the application relates to a composition comprising a metal nanoparticle, a silicone modified polyacrylate compound and a solvent.

In embodiments, described is a composition comprising a metal nanoparticle, a hydroxyl-functional silicone modified polyacrylate compound and a solvent.

In embodiments, described is a method of forming conductive features on a substrate, the method comprising: providing a liquid composition containing metal nanoparticles, a silicone modified polyacrylate compound and a solvent, depositing the liquid composition onto the substrate to form deposited features, and heating the deposited features on the substrate to a temperature from about 100° C. to about 200° C. to form conductive features on the substrate.

EMBODIMENTS

Described herein is a composition containing metal nanoparticles and exhibiting improved printing line performance. The composition is comprised of a metal nanoparticle solution that may optionally contain a stabilizer, a silicone modified polyacrylate compound and a solvent. After the composition is printed onto a substrate, the substrate is annealed to form conductive metal features on a substrate.

Metal Nanoparticles

The term "nano" as used in "metal nanoparticles" refers to, for example, a particle size of less than about 1,000 nm, such as, for example, from about 0.5 nm to about 1,000 nm, for example, from about 1 nm to about 500 nm, from about 1 nm to about 100 nm, from about 1 nm to about 25 nm or from about 1 to about 10 nm. The particle size refers to the average diameter of the metal particles, as determined by TEM (transmission electron microscopy) or other suitable method. Generally, a plurality of particle sizes may exist in the metal nanoparticles obtained from the process described herein. In embodiments, the existence of different sized silver-containing nanoparticles is acceptable.

The metal nanoparticle solution herein includes a metal nanoparticle in a liquid solution. In embodiments, the metal nanoparticles are composed of (i) one or more metals or (ii) one or more metal composites. Suitable metals may include, for example, Al, Ag, Au, Pt, Pd, Cu, Co, Cr, In, and Ni, particularly the transition metals, for example, Ag, Au, Pt, Pd, Cu, Cr, Ni, and mixtures thereof. Silver may be used as a suitable metal. Suitable metal composites may include Au—Ag, Ag—Cu, Ag—Ni, Au—Cu, Au—Ni, Au—Ag—Cu, and Au—Ag—Pd. The metal composites may also include non-metals, such as, for example, Si, C, and Ge. The various components of the metal composite may be present in an amount ranging, for example, from about 0.01% to about 99.9% by weight, particularly from about 10% to about 90% by weight. Furthermore, the composition described herein may not include any metal oxide nanoparticles.

In embodiments, the metal composite is a metal alloy composed of silver and one, two or more other metals, with silver comprising, for example, at least about 20% of the nanoparticles by weight, particularly greater than about 50% of the nanoparticles by weight.

Unless otherwise noted, the weight percentages recited herein for the components of the metal nanoparticles in the solution do not include the stabilizer.

The metal nanoparticles described herein may be prepared by a single throughput process (1×) or a double throughput process (2×). One of the differences between a metal nanoparticle powder prepared in a 1× process compared to a 2× process is that the ratio of the organic stabilizer, such as a organoamine, is greater in a 1× process than a 2× process. The decreased amount of organic stabilizer results in a more crystalline product with higher purity and silver content compared to 1× powders. Additional details regarding these processes are described in U.S. patent application Ser. No. 12/369,861 to Mahya Mokhtari, filed Feb. 12, 2009 entitled, which is incorporated by reference herein in its entirety.

The metal nanoparticles may be a mixture of two or more bimetallic metal nanoparticle species, such as those described in commonly assigned U.S. Patent Application Pub. No. 2009-0274834, which is incorporated herein by reference in its entirety, or a bimodal metal nanoparticle, such as those described in U.S. Patent Application Publication No. 2009-0301344, which is also incorporated herein by reference in its entirety.

If the metal nanoparticle is silver, the silver nanoparticles have a stability (that is, the time period where there is minimal precipitation or aggregation of the silver-containing nanoparticles) of, for example, at least about 1 day, or from about 3 days to about 1 week, from about 5 days to about 1 month, from about 1 week to about 6 months, from about 1 week to over 1 year.

The weight percentage of the metal nanoparticles in the composition may be from, for example, about 5 weight percent to about 80 weight percent, from about 10 weight percent to about 60 weight percent or from about 15 weight percent to about 50 weight percent.

Stabilizer

The composition described herein may also contain an organic stabilizer that is connected to the surface of the metal nanoparticles and is not removed until the annealing of the metal nanoparticles during formation of metal features on a substrate.

In embodiments, the stabilizer is physically or chemically associated with the surface of the metal nanoparticles. In this way, the nanoparticles have the stabilizer thereon outside of a liquid solution. That is, the nanoparticles with the stabilizer thereon may be isolated and recovered from a reaction mixture solution used in forming the nanoparticles and stabilizer complex. The stabilized nanoparticles may thus be subsequently readily and homogeneously dispersed in a solvent for forming a printable solution.

As used herein, the phrase "physically or chemically associated" between the metal nanoparticles and the stabilizer may be a chemical bond and/or other physical attachment. The chemical bond can take the form of, for example, covalent bonding, hydrogen bonding, coordination complex bonding, or ionic bonding, or a mixture of different chemical bonds. The physical attachment can take the form of, for example, van der Waals' forces or dipole-dipole interaction, or a mixture of different physical attachments.

The term "organic" in "organic stabilizer" refers to, for example, the presence of carbon atom(s), but the organic stabilizer may include one or more non-metal heteroatoms such as nitrogen, oxygen, sulfur, silicon, halogen, and the like. The organic stabilizer may be an organoamine stabilizer such as those described in U.S. Pat. No. 7,270,694, which is incorporated by reference herein in its entirety. Examples of the organoamine are an alkylamine, such as for example butylamine, pentylamine, hexylamine, heptylamine, octylamine, nonylamine, decylamine, hexadecylamine, undecylamine, dodecylamine, tridecylamine, tetradecylamine, diaminopentane, diaminohexane, diaminoheptane, diaminooctane, diaminononane, diaminodecane, diaminooctane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine, and the like, or mixtures thereof.

Examples of other organic stabilizers include, for example, thiol and its derivatives, —OC(=S)SH (xanthic acid), polyethylene glycols, polyvinylpyridine, polyvinylpyrrolidone, and other organic surfactants. The organic stabilizer may be selected from the group consisting of a thiol such as, for example, butanethiol, pentanethiol, hexanethiol, heptanethiol, octanethiol, decanethiol, and dodecanethiol; a dithiol such as, for example, 1,2-ethanedithiol, 1,3-propanedithiol, and 1,4-butanedithiol; or a mixture of a thiol and a dithiol. The organic stabilizer may be selected from the group consisting of a xanthic acid such as, for example, O-methylxanthate, O-ethylxanthate, O-propylxanthic acid, O-butylxanthic acid, O-pentylxanthic acid, O-hexylxanthic acid, O-heptylxanthic acid, O-octylxanthic acid, O-nonylxanthic acid, O-decylxanthic acid, O-undecylxanthic acid, O-dodecylxanthic acid. Organic stabilizers containing a pyridine derivative (for example, dodecyl pyridine) and/or organophosphine that can stabilize metal nanoparticles may also be used as the stabilizer herein.

Further examples of organic stabilized metal nanoparticles may include: the carboxylic acid-organoamine complex stabilized metal nanoparticles, described in U.S. Patent Application Pub. No. 2009-0148600; the carboxylic acid stabilizer metal nanoparticles described in U.S. Patent App. Pub. No. 2007/0099357 A1, and the thermally removable stabilizer and the UV decomposable stabilizers described in U.S. Patent Application Pub. No. 2009-0181183, each of which is incorporated by reference herein in their entirety.

The extent of the coverage of stabilizer on the surface of the metal nanoparticles can vary, for example, from partial to full coverage depending on the capability of the stabilizer to stabilize the metal nanoparticles. Of course, there is variability as well in the extent of coverage of the stabilizer among the individual metal nanoparticles.

The weight percentage of the optional stabilizer in the metal nanoparticle solution may be from, for example, about 5 weight percent to about 80 weight percent, from about 10 weight percent to about 60 weight percent or from about 15 weight percent to about 50 weight percent.

Silicone Modified Polyacyrlate Compound

The composition further comprises a silicone modified polyacrylate compound. The silicone modified polyacrylate compound may be a silicone modified polyacrylate with at least one organic functional moiety. The silicone modified polyacrylate compound may increase the hydrophobicity and/or oleophobicity of the composition. The inclusion of the silicone modified polyacrylate may effectively mitigate the "coffee ring effect", which is defined herein as the narrowing of the width of printed metal lines and increasing metal line thickness. Furthermore, the silicone modified polyacrylate may improve substrate wetting, leveling, surface slip, and anti-blocking properties, while being compatible with jettability and stability requirements for an ink formation.

In embodiments, the silicone modified polyacrylate compound may be a silicone modified polyacrylate with at least one organic functional moiety. The at least one organic functional moiety of the silicone modified polyacrylate compound may be selected from the group consisting of a hydroxyl moiety, an epoxy moiety, an amino moiety, an acetyl moiety, a cyano moiety, a halogen moiety, a mercapto moiety, a sulfide moiety, a vinyl moiety, an alkoxyalkyl moiety, a carbamate moiety, a carboxyl moiety, an ester moiety, an aromatic moiety, and an alkyl moiety.

In further embodiments, the silicone modified polyacrylate is a hydroxyl functional silicone modified polyacrylate. Examples of hydroxyl functional silicone modified polyacylates are SILCLEAN 3700 (manufactured by BYK Altana) and NLC Additive SS1 (manufactured by Northants Leather Chemicals).

The silicone modified polyacrylate compound may be dissolved in a solvent having a methoxy moiety, such as, for example, methoxypropylacetate and methoxypropanol. The solvent used to dissolve the silicon modified polyacrylate compound may be the same or different than the solvent used to dissolve the metal nanoparticles.

The silicone modified polyacrylate compound may be present in the solvent in an amount of at least 10 weight percent of the composition, such as for example from about 10 weight percent to about 50 weight percent, from about 15 weight percent to about 50 weight percent, from about 15 weight percent to about 40 weight percent, from about 20 weight percent to about 30 weight percent, from about 25 weight percent to about 30 weight percent of the silicone modified polyacrylate compound/solvent.

The silicone modified polyacylate may be present in the composition in an amount of at least 0.1 weight percent of the composition, such as for example from about 0.1 weight percent to about 10 weight percent, from about 0.5 weight percent to about 10 weight percent, from about 1 weight percent to about 8 weight percent, from about 2 weight percent to about 6 weight percent, from about 3 weight percent to about 5 weight percent, and from about 0.5 to about 2 weight percent of the composition.

The composition comprised of the metal nanoparticles and the silicone modified polyacrylate compound may be produced by dispersing the metal nanoparticles and the silicone modified polyacrylate compound in any suitable dispersing solvent and depositing the composition on a substrate to form a conductive feature. The composition may be used to print and form conductive features on a substrate.

The dispersing solvent should facilitate the dispersion of the unstabilized or stabilized metal nanoparticles and the low-polarity additive. Examples of the dispersing solvent may include, for example, an alkane or an alcohol having from about 10 to about 18 carbon atoms or from about 10 to about 14 carbon atoms, such as, undecane, dodecane, tridecane, tetradecane, 1-undecanol, 2-undecanol, 3-undecanol, 4-undecanol, 5-undecanol, 6-undecanol, 1-dodecanol, 2-dodecanol, 3-dodecanol, 4-dodecanol, 5-dodecanol, 6-dodecanol, 1-tridecanol, 2-tridecanol, 3-tridecanol, 4-tridecanol, 5-tridecanol, 6-tridecanol, 7-tridecanol, 1-tetradecanol, 2-tetradecanol, 3-tetradecanol, 4-tetradecanol, 5-tetradecanol, 6-tetradecanol, 7-tetradecanol, and the like; a monoterpene alcohol, such as for example, terpineol ($\alpha$-terpineol), $\beta$-terpineol, geraniol, cineol, cedral, linalool, 4-terpineol, lavandulol, citronellol, nerol, methol, borneol, and the like; isoparaffinc hydrocarbons, such as, for example, isodecane, isododecane, and commercially available mixtures of isoparaffins such as ISOPAR E, ISOPAR G, ISOPAR H, ISOPAR L and ISOPAR M (all the above-mentioned manufactured by Exxon Chemical Company), SHELLSOL (made by Shell Chemical Company), SOLTROL (made by Philips Oil Co., Ltd.), BEGASOL (made by Mobil Petroleum Co., Inc.) and IP Solvent 2835 (made by Idemitsu Petrochemical Co., Ltd.); toluene; xylene; tetrahydrofuran; chlorobenzene; dichlorobenzene; trichlorobenzene; nitrobenzene; cyanobenzene; acetonitrile; dichloromethane; N,N-dimethylformamide (DMF); N-methyl-2-pyrrolidone; and mixtures thereof. Further examples of dispersing solvents include the dispersing solvents disclosed in U.S. patent application Ser. No. 12/331,573, which is incorporated by reference herein in its entirety.

One, two, three or more solvents may be used. In embodiments where two or more solvents are used, each solvent may be present at any suitable volume ratio or molar ratio such, as for example, from about 99 (first solvent):1 (second solvent) to about 1 (first solvent):99 (second solvent), from about 67 (first solvent):33 (second solvent).

The solvent may be present in the composition in an amount of at least 10 weight percent of the composition, such as for example from about 10 weight percent to about 70 weight percent, from about 30 weight percent to about 60 weight percent, from about 30 weight percent to about 55 weight percent and from about 40 weight percent to about 50 weight percent of the composition.

The fabrication of conductive features, such as an electrically conductive element, from the metal nanoparticle dispersion can be carried out by depositing the composition on a substrate using any suitable liquid deposition technique at any suitable time prior to or subsequent to the formation of other optional layer or layers on the substrate. Thus, liquid deposition of the composition on the substrate can occur either on a substrate or on a substrate already containing layered material, for example, a semiconductor layer and/or an insulating layer.

The phrase "liquid deposition technique" refers to, for example, deposition of a composition using a liquid process such as printing or liquid coating, where the liquid is a homogeneous or heterogeneous dispersion of the metal nanoparticles and the silicone modified polyacrylate compound. The metal nanoparticle composition may be referred to as an ink when deposited on a substrate. Examples of liquid coating processes may include, for example, spin coating, blade coating, rod coating, dip coating, and the like. Examples of printing techniques may include, for example, lithography or offset printing, gravure, flexography, screen printing, stencil printing, inkjet printing, stamping (such as microcontact printing), and the like. Liquid deposition deposits a layer or line of the composition having a thickness ranging from about 5 nanometers to about 5 millimeters, preferably from about 10 nanometers to about 1000 micrometers on the substrate. The deposited metal nanoparticle composition at this stage may or may not exhibit appreciable electrical conductivity.

The metal nanoparticles can be spin-coated from the metal nanoparticles dispersion, for example, for about 10 seconds to about 1000 seconds, for about 50 seconds to about 500 seconds or from about 100 seconds to about 150 seconds, onto a substrate at a speed, for example, from about 100 revolutions per minute ("rpm") to about 5000 rpm, from about 500 rpm to about 3000 rpm and from about 500 rpm to about 2000 rpm.

The substrate upon which the metal features are deposited may be any suitable substrate, including, for example, silicon, glass plate, plastic film, sheet, fabric, or paper. For structurally flexible devices, plastic substrates, such as for example polyester, polycarbonate, polyimide sheets and the like may be used. The thickness of the substrate may be from amount 10 micrometers to over 10 millimeters with an exemplary thickness being from about 50 micrometers to about 2 millimeters, especially for a flexible plastic substrate and from about 0.4 to about 10 millimeters for a rigid substrate such as glass or silicon.

Heating the deposited composition at a temperature of, for example, at or below about 200° C., such as, for example, from about 100° C. to about 200° C., from about 100° C. to about 180° C. and from about 100° C. to about 160° C., to induce the metal nanoparticles to "anneal" and thus form an electrically conductive layer, which is suitable for use as an electrically conductive element in electronic devices. The heating temperature is one that does not cause adverse changes in the properties of previously deposited layer(s) or the substrate (whether single layer substrate or multilayer substrate). Also, the low heating temperatures described above allows the use of low cost plastic substrates, which have an annealing temperature below 200° C.

The heating can be performed for a time ranging from, for example, 1 second to about 10 hours and from about 10 seconds to 1 hour. The heating can be performed in air, in an inert atmosphere, for example, under nitrogen or argon, or in a reducing atmosphere, for example, under nitrogen containing from 1 to about 20 percent by volume hydrogen. The heating can also be performed under normal atmospheric pressure or at a reduced pressure of, for example, from about 1000 mbars to about 0.01 mbars.

As used herein, the term "heating" encompasses any technique(s) that can impart sufficient energy to the heated material or substrate to (1) anneal the metal nanoparticles and/or (2) remove the optional stabilizer from the metal nanoparticles. Examples of heating techniques may include thermal heating (for example, a hot plate, an oven, and a burner), infra-red ("IR") radiation, a laser beam, microwave radiation, or UV radiation, or a combination thereof.

Heating produces a number of effects. Prior to heating, the layer of the deposited metal nanoparticles may be electrically insulating or with very low electrical conductivity, but heating results in an electrically conductive layer composed of annealed metal nanoparticles, which increases the conductivity. In embodiments, the annealed metal nanoparticles may be coalesced or partially coalesced metal nanoparticles. In embodiments, it may be possible that in the annealed metal nanoparticles, the metal nanoparticles achieve sufficient particle-to-particle contact to form the electrically conductive layer without coalescence.

In embodiments, after heating, the resulting electrically conductive line that includes the silicone modified polyacrylate compound has a thickness ranging, for example, from about 5 nanometers to about 5 microns, from about 10 nanometers to about 2 microns, from about 50 nanometers to about 200 nanometers microns, from about 50 nanometers to about 100 nanometers and from about 50 nanometers to about 90 nanometers. Furthermore, after heating the resulting electrically conductive line, the inclusion of the silicone modified polyacrylate compound in the composition results in the electrically conductive line having a width less than about 200 microns, such as, for example from about 10 microns to about 200 microns, from about 25 microns to about 150 microns, from about 50 microns to about 100 microns and from about 75 microns to about 100 microns.

The conductivity of the resulting metal element produced by heating the deposited metal nanoparticle composition is, for example, more than about 100 Siemens/centimeter ("S/cm"), more than about 1000 S/cm, more than about 2,000 S/cm, more than about 5,000 S/cm, or more than about 10,000 S/cm.

Thin Film Transistors

The resulting elements can be used as electrodes, conductive pads, thin-film transistors, conductive lines, conductive tracks, and the like in electronic devices such as thin film transistors, organic light emitting diodes, RFID (radio frequency identification) tags, photovoltaic, printed antenna and other electronic devices which require conductive elements or components.

In yet other embodiments, there is provided a thin film transistor comprising:

(a) an insulating layer;
(b) a gate electrode;
(c) a semiconductor layer;
(d) a source electrode; and
(e) a drain electrode, wherein the insulating layer, the gate electrode, the semiconductor layer, the source electrode, and the drain electrode are in any sequence as long as the gate electrode and the semiconductor layer both contact the insulating layer, and the source electrode and the drain electrode both contact the semiconductor layer, and wherein at least one of the source electrode, the drain electrode, and the gate electrode are formed by: providing a solution containing metal nanoparticles and a silicone modified polyacrylate compound, depositing the solution onto the substrate, and heating the solution on the substrate to a temperature from about 100° C. to about 200° C. to form conductive features on the substrate.

A gate electrode, a source electrode, and a drain electrode may thus be fabricated by embodiments herein. The thickness of the gate electrode layer ranges for example from about 10 to about 2000 nm. Typical thicknesses of source and drain electrodes are, for example, from about 40 nm to about 1 micrometer with the more specific thickness being about 60 nanometers to about 400 nm.

The insulating layer generally can be an inorganic material film or an organic polymer film. Examples of inorganic materials suitable as the insulating layer may include, for example, silicon oxide, silicon nitride, aluminum oxide, barium titanate, barium zirconium titanate and the like. Illustrative examples of organic polymers for the insulating layer may include, for example, polyesters, polycarbonates, poly(vinyl phenol), polyimides, polystyrene, poly(methacrylate)s, poly (acrylate)s, epoxy resin and the like. The thickness of the insulating layer is, for example from about 10 nm to about 500 nm depending on the dielectric constant of the dielectric material used. An exemplary thickness of the insulating layer is from about 100 nm to about 500 nm. The insulating layer may have a conductivity that is, for example, less than about $10^{-12}$ S/cm.

Situated, for example, between and in contact with the insulating layer and the source/drain electrodes is the semiconductor layer wherein the thickness of the semiconductor layer is generally, for example, about 10 nm to about 1 micrometer, or about 40 to about 100 nm. Any semiconductor material may be used to form this layer. Exemplary semiconductor materials include regioregular polythiophene, oligthiophene, pentacene, and the semiconductor polymers disclosed in U.S. Publication No. 2003/0160230 A1; U.S. Publication No. 2003/0160234 A1; U.S. Publication No. 2003/0136958 A1; the disclosures of which are totally incorporated herein by reference. Any suitable technique may be used to form the semiconductor layer. One such method is to apply a vacuum of about $10^{-5}$ torr to $10^{-7}$ torr to a chamber containing a substrate and a source vessel that holds the compound in powdered form, and heat the vessel until the compound sublimes onto the substrate. The semiconductor layer can also generally be fabricated by solution processes such as spin coating, casting, screen printing, stamping, or jet printing of a solution or dispersion of the semiconductor.

The insulating layer, the gate electrode, the semiconductor layer, the source electrode, and the drain electrode are formed in any sequence, particularly where in embodiments the gate electrode and the semiconductor layer both contact the insulating layer, and the source electrode and the drain electrode both contact the semiconductor layer. The phrase "in any sequence" includes sequential and simultaneous formation. For example, the source electrode and the drain electrode can be formed simultaneously or sequentially. The composition, fabrication, and operation of thin film transistors are described in U.S. Pat. No. 6,107,117, the disclosure of which is totally incorporated herein by reference.

In embodiments, at least one of the gate, source or drain electrode in a thin-film transistor is formed by using a method described herein to form conductive features on a substrate, providing a solution containing stabilized metal nanoparticles and an silicone modified polyacrylate compound; depositing the solution onto the substrate, wherein during the deposition or following the deposition of the solution onto the substrate, and removing the stabilizer, at a temperature below about 200° C., to form conductive features on the substrate.

Embodiments herein are further illustrated by way of the following examples. All percentages and parts are by weight unless otherwise indicated. Room temperature refers to a temperature ranging for example from about 20 to about 25° C.

EXAMPLES

Preparation of Aminoalkane-Stabilized Silver Nanoparticles

1× Powder Process

Hexadecylamine was pre-heated to 50-60° C. to melt in the original bottle. 144.6 grams of 1-hexadecylamine (600 millimoles, Aldrich, 90%) and 160 ml of toluene were heated to around 65° C. under agitation in a 1 L jacketed reactor under nitrogen blanket. 20 grams of silver acetate (120 mmoles, Alfa Aesar, 99%) was then added to the reactor over 2 minutes; the silver acetate dissolved rapidly. A second portion of hexadecylamine (144.6 grams) was poured into the reactor and the solution was cooled to 55° C. over a period of 45 minutes. 7.13 grams of phenylhydrazine (66 mmoles, Aldrich, 97%) diluted in 10 ml of toluene was added to the reactor over 10 minutes. The solution became a black-red color, indicating the reduction of silver particles and the formation of silver nanoparticles. The solution was mixed for 15 more minutes to ensure completion of the reduction reaction. The reactor was then cooled down to below 50° C. and the product was precipitated by adding 240 ml of isopropanol, followed by 560 ml of methanol, to the reactor. The solution turned a dark purple-blue color. The solution was allowed to mix for 5 minutes, then discharged and transferred over to a vacuum filtration unit with a 3-inch diameter filter fitted with 0.5 µm GORE-TEX membrane. The metallic blue cake was dispersed in 200 ml of isopropanol and washed for 30 minutes to remove any residual amines and byproducts from the reaction. The mixture was filtered using the same filter media. This was followed by three 50 ml methanol rinses to help remove isopropanol from the surface of the particles. The particles were then dried in a vacuum oven overnight at 30-40° C. The final yield of product was 15.21 grams (94.4% theoretical) containing 81% silver (estimated from TGA analysis).

Preparation of Aminoalkane-Stabilized Silver Nanoparticles (2× Powder Process)

Hexadecylamine was pre-heated to 50-60° C. to melt in the original bottle. 144.6 grams of 1-hexadecylamine (600 mmol, Aldrich, 90%) and 160 ml of toluene were heated to around 65° C. under agitation in a 1 L jacketed reactor under nitrogen blanket. 40 grams of silver acetate (240 mmol, Alfa Aesar, 99%) was then added to the reactor over 2 minutes; the silver acetate dissolved rapidly. A second portion of hexadecylamine (144.6 grams) was poured into the reactor and the solution was cooled to 55° C. over a period of 45 minutes. 14.3 grams of phenylhydrazine (133 mmoles, Aldrich, 97%) diluted in 12 ml of toluene was added to the reactor over 10 minutes. The solution became a black-red color, indicating the reduction of silver particles and the formation of silver nanoparticles. The solution was mixed for 15 more minutes to ensure completion of the reduction reaction. The reactor was then cooled down to below 45° C. and the product was precipitated by adding 780 ml of methanol, followed by 320 ml of isopropanol, to the reactor. The solution turned a dark purple-blue color. The solution was allowed to mix for 5 minutes, then discharged and transferred over to a vacuum filtration unit with a 3-inch diameter filter fitted with 0.5 µm GORE-TEX membrane. The metallic blue cake was dispersed twice in isopropanol (2×480 mL) and washed for 30 minutes to remove any residual amines and byproducts from the reaction. The mixture was filtered using the same filter media. This was followed by three 50 ml methanol rinses to help remove isopropanol from the surface of the particles. The particles were then dried in a vacuum oven overnight at 30-40° C. The final yield of product was about 30 grams (95% of theoretical silver) containing 84% silver (estimated from TGA analysis).

Evaluation 1

Reference Ink Composition 25 grams of silver nanoparticles (1× powder) was dispersed into a 25 gram mixture of ISOPAR G and terpineol (ISOPAR G=16.67 g, terpineol=8.33 g) to form an ink composition. The ink composition was mixed for 3 hours at a temperature at 38-40° C. and then filtered though a 5 µm filter before packaging.

Example 1

Ink Composition A 25 grams of silver nanoparticles (2× powder) was dispersed into a 25 gram mixture of ISOPAR G and terpineol (ISOPAR G=16.67 g, terpineol=8.33 g) to form an ink composition. The ink composition was mixed for 3 hours at a temperature at 38-40° C. and then filtered though a 5 µm filter before packaging. 0.02 grams of SILCLEAN 3700 was added to 2 grams of the ink composition to form a resulting mixture. The resulting mixture was place on a lab shaker (IKA MS2 Minishaker) for 5 to 10 minutes.

Ink Composition A was printed on a glass slide using a DIMATIX 2800 Materials Printer using a piezo drop-on-demand ink cartridge to form thin brown lines of silver nanoparticles. The thin lines of silver nanoparticles were heated in an oven at a temperature of 140° C. for 10 minutes to anneal the silver nanoparticles, and form shiny mirror-like thin lines having a thickness of approximately 111 nm and a width of 105 µm, as measured using a Veeco Dektak 6M Surface Profiler. The average conductivity of the annealed silver lines was $2.9 \times 10^4$ S/cm, as measured by KEITHLEY 4200-SCS 2 point probe.

Example 2

Ink Composition B 1 gram of silver nanoparticles (2× powder) was dispersed into a 1 gram mixture of ISOPAR G and terpineol (ISOPAR G=0.67 g, terpineol=0.33 g) to form an ink composition. The ink composition was mixed for 3 hours at a temperature at 38-40° C. and then filtered though a 1 µm filter before packaging. 6.8 mg of SILCLEAN 3700 was added to 0.54 grams of the ink composition to form a resulting mixture. The resulting mixture was place on a lab shaker (IKA MS2 Minishaker) for 5 to 10 minutes.

Ink Composition B was printed on a glass slide using a DIMATIX 2800 Materials Printer using a piezo drop-on-demand ink cartridge to form thin brown lines of silver nanoparticles. The thin lines of silver nanoparticles were heated in an oven at a temperature of 140° C. for 10 minutes to anneal the silver nanoparticles, and form shiny mirror-like thin lines having a thickness of approximately 90 nm and a width of 120 µm, as measured using a Veeco Dektak 6M Surface Profiler.

The average conductivity of the annealed silver lines was $4.1 \times 10^4$ S/cm, as measured by KEITHLEY 4200-SCS 2 point probe.

Example 3

Ink Composition C 1 gram of silver nanoparticles (2x powder) was dispersed into a 1 gram mixture of ISOPAR G and terpineol (ISOPAR G=0.67 g, terpineol=0.33 g) to form an ink composition. The ink composition was mixed for 3 hours at a temperature at 38-40° C. and then filtered though a 1 µm filter before packaging. 8 mg of SILCLEAN 3700 was added to 0.58 grams of the ink composition to form a resulting mixture. The resulting mixture was place on a lab shaker (IKA MS2 Minishaker) for 5 to 10 minutes.

Ink Composition C was printed on a glass slide using a DIMATIX 2800 Materials Printer using a piezo drop-on-demand ink cartridge to form thin brown lines of silver nanoparticles. The thin lines of silver nanoparticles were heated in an oven at a temperature of 140° C. for 10 minutes to anneal the silver nanoparticles, and form shiny mirror-like thin lines having a thickness of approximately 146 nm and a width of 74 µm, as measured using a Veeco Dektak 6M Surface Profiler. The average conductivity of the annealed silver lines was $2.9 \times 10^4$ S/cm, as measured by KEITHLEY 4200-SCS 2-point probe.

Example 4

Ink Composition D 1 gram of silver nanoparticles (2x powder) was dispersed into a 1 gram mixture of ISOPAR G and terpineol (ISOPAR G=0.67 g, terpineol=0.33 g) to form an ink composition. The ink composition was mixed for 3 hours at a temperature at 38-40° C. and then filtered though a 1 µm filter before packaging. 8 mg of SILCLEAN 3700 was added to 0.8 grams of the ink composition to form a resulting mixture. The resulting mixture was place on a lab shaker (IKA MS2 Minishaker) for 5 to 10 minutes.

Ink Composition D was printed on a glass slide using a DIMATIX 2800 Materials Printer using a piezo drop-on-demand ink cartridge to form thin brown lines of silver nanoparticles. The thin lines of silver nanoparticles were heated in an oven at a temperature of 140° C. for 10 minutes to anneal the silver nanoparticles, and form shiny mirror-like thin lines having a thickness of approximately 133 nm and a width of 78 µm, as measured using a Veeco Dektak 6M Surface Profiler. The average conductivity of the annealed silver lines was $5.9 \times 10^4$ S/cm, as measured by a KEITHLEY 4200-SCS 2 point probe.

Example 5

Ink Composition E 12.5 grams of silver nanoparticles (2x powder) was dispersed into a 12.5 gram mixture of ISOPAR G and terpineol (ISOPAR G=8.33 g, terpineol=4.17 g) to form an ink composition. The ink composition was mixed for 3 hours at a temperature at 38-40° C. and then filtered though a 5 µm filter before packaging. 9.3 mg of SILCLEAN 3700 was added to 0.93 grams of the ink composition to form a resulting mixture. The resulting mixture was place on a lab shaker (IKA MS2 Minishaker) for 5 to 10 minutes.

Ink Composition E was printed on a glass slide using a DIMATIX 2800 Materials Printer using a piezo drop-on-demand ink cartridge to form thin brown lines of silver nanoparticles. The thin lines of silver nanoparticles were heated in an oven at a temperature of 140° C. for 10 minutes to anneal the silver nanoparticles, and form shiny mirror-like thin lines having a thickness of approximately 55 nm and a width of 173 µm, as measured using a Veeco Dektak 6M Surface Profiler. The average conductivity of the annealed silver lines was $5.7 \times 10^3$ S/cm, as measured by a KEITHLEY 4200-SCS 2 point probe.

Comparative Example 1

Ink Composition F (without SILCLEAN)

0.60 grams of silver nanoparticles (2x powder) was dispersed into a 0.60 gram mixture of ISOPAR G and terpineol (ISOPAR G=16.67 g, terpineol=8.33 g) to form an ink composition. The ink composition was mixed for 3 hours at a temperature at 38-40° C. and then filtered though a 0.22 µm filter before packaging.

Ink Composition F was printed on a glass slide using a DIMATIX 2800 Materials Printer using a piezo drop-on-demand ink cartridge to form thin brown lines of silver nanoparticles. The thin lines of silver nanoparticles were heated in an oven at a temperature of 140° C. for 10 minutes to anneal the silver nanoparticles, and form shiny mirror-like thin lines having a thickness of approximately 94 nm and a width of 153 µm, as measured using a Veeco Dektak 6M Surface Profiler. The average conductivity of the annealed silver lines was $1.0 \times 10^3$ S/cm, as measured by a KEITHLEY 4200-SCS 2 point probe.

Comparative Example 2

Ink Composition G (without SILCLEAN)

1 gram of silver nanoparticles (2x powder) was dispersed into a 1 gram mixture of ISOPAR G and terpineol (ISOPAR G=0.67 g, terpineol=0.33 g) to form an ink composition. The ink composition was mixed for 3 hours at a temperature at 38-40° C. and then filtered though a 1 µm filter before packaging.

Ink Composition G was printed on a glass slide using a DIMATIX 2800 Materials Printer using a piezo drop-on-demand ink cartridge to form thin brown lines of silver nanoparticles. The thin lines of silver nanoparticles were heated in an oven at a temperature of 140° C. for 10 minutes to anneal the silver nanoparticles, and form shiny mirror-like thin lines having a thickness of approximately 87 nm and a width of 188 µm, as measured using a Veeco Dektak 6M Surface Profiler. The average conductivity of the annealed silver lines was $8.3 \times 10^3$ S/cm, as measured by a KEITHLEY 4200-SCS 2 point probe.

Comparative Example 3

Ink Composition H (without SILCLEAN)

1 gram of silver nanoparticles (2x powder) was dispersed into a 1 gram mixture of ISOPAR G and terpineol (ISOPAR G=0.67 g, terpineol=0.33 g) to form an ink composition. The ink composition was mixed for 3 hours at a temperature at 38-40° C. and then filtered though a 1 µm filter before packaging.

Ink Composition H was printed on a glass slide using a DIMATIX 2800 Materials Printer using a piezo drop-on-demand ink cartridge to form thin brown lines of silver nanoparticles. The thin lines of silver nanoparticles were heated in an oven at a temperature of 140° C. for 10 minutes to anneal the silver nanoparticles, and form shiny mirror-like thin lines having a thickness of approximately 71 nm and a width of 162 µm, as measured using a Veeco Dektak 6M Surface Profiler. The average conductivity of the annealed silver lines was $3.1 \times 10^4$ S/cm, as measured by a KEITHLEY 4200-SCS 2 point probe.

Comparative Example 4

Ink Composition I (without SILCLEAN)

1 gram of silver nanoparticles (2× powder) was dispersed into a 1 gram mixture of ISOPAR G and terpineol (ISOPAR G=0.67 g, terpineol=0.33 g) to form an ink composition. The ink composition was mixed for 3 hours at a temperature at 38-40° C. and then filtered though a 1 µm filter before packaging.

Ink Composition I was printed on a glass slide using a DIMATIX 2800 Materials Printer using a piezo drop-on-demand ink cartridge to form thin brown lines of silver nanoparticles. The thin lines of silver nanoparticles were heated in an oven at a temperature of 140° C. for 10 minutes to anneal the silver nanoparticles, and form shiny mirror-like thin lines having a thickness of approximately 107 nm and a width of 91 µm, as measured using a Veeco Dektak 6M Surface Profiler. The average conductivity of the annealed silver lines was $6.7 \times 10^4$ S/cm, as measured by a KEITHLEY 4200-SCS 2 point probe.

Comparative Example 5

Ink Composition J (without SILCLEAN)

12.5 grams of silver nanoparticles (2× powder) was dispersed into a 12.5 gram mixture of ISOPAR G and terpineol (ISOPAR G=8.33 g, terpineol=4.17 g) to form an ink composition. The ink composition was mixed for 3 hours at a temperature at 38-40° C. and then filtered though a 5 µm filter before packaging.

Ink Composition J was printed on a glass slide using a DIMATIX 2800 Materials Printer using a piezo drop-on-demand ink cartridge to form thin brown lines of silver nanoparticles. The thin lines of silver nanoparticles were heated in an oven at a temperature of 140° C. for 10 minutes to anneal the silver nanoparticles, and form shiny mirror-like thin lines having a thickness of approximately 54 nm and a width of 232 µm, as measured using a Veeco Dektak 6M Surface Profiler. The average conductivity of the annealed silver lines was $1.4 \times 10^4$ S/cm, as measured by a KEITHLEY 4200-SCS 2 point probe.

The ink compositions in Examples 1-5 resulted in a narrower print line than the ink compositions of Comparative Examples 1-5. The lines printed with the additive (SILCLEAN) did not exhibit a "coffee ring effect", are narrower than the lines printed without the additive and thicker. As such, the printed silver lines with the additive are more conductive than the lines printed without the additive.

Evaluation 2(A)

Example 6

Preparation of Ink Composition K (1% SILCLEAN)

Ink Composition K is exactly the same to Ink Composition D of Evaluation 1. As discussed above, the thin lines of silver nanoparticles were heated in an oven at a temperature of 140° C. for 10 minutes to anneal the silver nanoparticles, and form shiny mirror-like thin lines having a thickness of approximately 133 nm and a width of 77 µm, as measured using a Veeco Dektak 6M Surface Profiler. The average conductivity of the annealed silver lines was $5.9 \times 10^4$ S/cm, as measured by a KEITHLEY 4200-SCS 2 point probe.

Example 7

Preparation of Ink Composition L (3.5% SILCLEAN)

1 gram of silver nanoparticles (2× powder) was dispersed into a 1 gram mixture of ISOPAR G and terpineol (ISOPAR G=0.67 g, terpineol=0.33 g) to form an ink composition. The ink composition was mixed for 3 hours at a temperature at 38-40° C. and then filtered though a 1 µm filter before packaging. 30 mg of SILCLEAN 3700 was added to 0.8 grams of the ink composition to form a resulting mixture. The resulting mixture was place on a lab shaker (IKA MS2 Minishaker) for 5 to 10 minutes.

Ink Composition L was printed on a glass slide using a DIMATIX 2800 Materials Printer using a piezo drop-on-demand ink cartridge to form thin brown lines of silver nanoparticles. The thin lines of silver nanoparticles were heated in an oven at a temperature of 140° C. for 10 minutes to anneal the silver nanoparticles, and form shiny mirror-like thin lines having a thickness of approximately 171 nm and a width of 85 µm, as measured using a Veeco Dektak 6M Surface Profiler. The average conductivity of the annealed silver lines was $3.3 \times 10^4$ S/cm, as measured by a KEITHLEY 4200-SCS 2 point probe.

Comparative Example 6

Ink Composition M (without SILCLEAN)

Ink Composition M is exactly the same to Ink Composition I of Evaluation 1. As discussed above, the thin lines of silver nanoparticles were heated in an oven at a temperature of 140° C. for 10 minutes to anneal the silver nanoparticles, and form shiny mirror-like thin lines having a thickness of approximately 107 nm and a width of 91 µm, as measured using a Veeco Dektak 6M Surface Profiler. The average conductivity of the annealed silver lines was $6.7 \times 10^4$ S/cm, as measured by a KEITHLEY 4200-SCS 2 point probe.

Evaluation 2B

Example 8

Preparation of Ink Composition N (1% SILCLEAN)

Ink Composition N is exactly the same to Ink Composition E of Evaluation 1. As discussed above, thin lines of silver nanoparticles were heated in an oven at a temperature of 140° C. for 10 minutes to anneal the silver nanoparticles, and form shiny mirror-like thin lines having a thickness of approximately 55 nm and a width of 173 µm measured using a Veeco Dektak 6M Surface Profiler. The average conductivity of the annealed silver lines was $5.7 \times 10^3$ S/cm, as measured by a KEITHLEY 4200-SCS 2 point probe.

Example 9

Preparation of Ink Composition O (2% SILCLEAN)

12.5 grams of silver nanoparticles (2× powder) was dispersed into a 12.5 gram mixture of ISOPAR G and terpineol (ISOPAR G=8.33 g, terpineol=4.17 g) to form an ink composition. The ink composition was mixed for 3 hours at a temperature at 38-40° C. and then filtered though a 5 μm filter before packaging. 20 mg of SILCLEAN 3700 was added to 1 grams of the ink composition to form a resulting mixture. The resulting mixture was place on a lab shaker (IKA MS2 Minishaker) for 5 to 10 minutes.

Ink Composition O was printed on a glass slide using a DIMATIX 2800 Materials Printer using a piezo drop-on-demand ink cartridge to form thin brown lines of silver nanoparticles. The thin lines of silver nanoparticles were heated in an oven at a temperature of 140° C. for 10 minutes to anneal the silver nanoparticles, and form shiny mirror-like thin lines having a thickness of approximately 60 nm and a width of 140 μm, as measured using a Veeco Dektak 6M Surface Profiler. The average conductivity of the annealed silver lines was $7.5 \times 10^3$ S/cm, as measured by a KEITHLEY 4200-SCS 2 point probe.

Example 10

Preparation of Ink Composition P (3% SILCLEAN)

12.5 grams of silver nanoparticles (2× powder) was dispersed into a 12.5 gram mixture of ISOPAR G and terpineol (ISOPAR G=8.33 g, terpineol=4.17 g) to form an ink composition. The ink composition was mixed for 3 hours at a temperature at 38-40° C. and then filtered though a 5 μm filter before packaging. 34 mg of SILCLEAN 3700 was added to 1.1 grams of the ink composition to form a resulting mixture. The resulting mixture was place on a lab shaker (IKA MS2 Minishaker) for 5 to 10 minutes.

Ink Composition P was printed on a glass slide using a DIMATIX 2800 Materials Printer using a piezo drop-on-demand ink cartridge to form thin brown lines of silver nanoparticles. The thin lines of silver nanoparticles were heated in an oven at a temperature of 140° C. for 10 minutes to anneal the silver nanoparticles, and form shiny mirror-like thin lines having a thickness of approximately 90 nm and a width of 98 μm, as measured using a Veeco Dektak 6M Surface Profiler. The average conductivity of the annealed silver lines was $2.7 \times 10^4$ S/cm, as measured by a KEITHLEY 4200-SCS 2 point probe.

Comparative Example 7

Ink Composition Q (without SILCLEAN)

Ink Composition Q is exactly the same to Ink Composition J of Evaluation 1. As discussed above, the thin lines of silver nanoparticles were heated in an oven at a temperature of 140° C. for 10 minutes to anneal the silver nanoparticles, and form shiny mirror-like thin lines having a thickness of approximately 54 nm and a width of 232 μm, as measured using a Veeco Dektak 6M Surface Profiler. The average conductivity $1.4 \times 10^4$ S/cm as measured by a KEITHLEY 4200-SCS 2 point probe.

As shown above in Examples 6-7 and Comparative Example 6, samples with a line width less than 100 micrometers, increasing the silicone modified polyacrylate compound concentration did not result in a narrower line. However, as shown above in Examples 8-10 and Comparative Examples 6, in samples with a line width greater than 200 micrometers, increasing the silicone modified polyacrylate compound concentration did result in a narrower line.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A composition comprising a metal nanoparticle, a silicone modified polyacrylate compound, a stabilizer and a solvent, wherein the metal nanoparticle and the polyacrylate compound are stably dispersed in the solvent and the stabilizer is physically or chemically associated with the surface of the metal nanoparticle.

2. The composition of claim 1, wherein the metal nanoparticle is selected from the group consisting of silver, gold, platinum, palladium, copper, cobalt, chromium, nickel, silver-copper composite, silver-gold-copper composite, silver-gold-palladium composite and mixtures thereof.

3. The composition of claim 1, wherein the stabilizer is an organoamine stabilizer selected from the group consisting of butylamine, pentylamine, hexylamine, heptylamine, octylamine, nonylamine, decylamine, hexadecylamine, undecylamine, dodecylamine, tridecylamine, tetradecylamine, diaminopentane, diaminohexane, diaminoheptane, diaminooctane, diaminononane, diaminodecane, diaminooctane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine and mixtures thereof.

4. The composition of claim 1, wherein the silicone modified polyacrylate compound is a silicone modified polyacrylate compound with at least one organic functional moiety.

5. The composition of claim 4, wherein the at least one organic functional moiety of the silicone modified polyacrylate compound is selected from the group consisting of a hydroxyl moiety, an epoxy moiety, an amino moiety, an acetyl moiety, a cyano moiety, a halogen moiety, a mercapto moiety, a sulfide moiety, a vinyl moiety, an alkoxyalkyl moiety, a carbamate moiety, a carboxyl moiety, an ester moiety, an aromatic moiety, and an alkyl moiety.

6. The composition of claim 1, wherein the silicone modified polyacrylate compound is from about 0.1 to about 10 weight percent of the composition.

7. The composition of claim 1, wherein the solvent is selected from the group consisting of water, an isoparaffinic hydrocarbon solvent, a monoterpene alcohol, an alkyl alcohol having from 1 to about 16 carbon atoms, a cyclocarbyl alcohol having from about 5 to about 15 carbon atoms, an alkane having from about 6 to about 16 carbon atoms, an alkyl acetate having from about 3 to about 12 carbon atoms, toluene, xylene, mesitylene, chlorobenzene, dichlorobenzene, cyanobenzene, acetonitrile, N,N-dimethylformamide (DMF), N-methyl-2-pyrrolidone, and combinations thereof.

8. The composition of claim 1, wherein the metal nanoparticle is about 10 to about 60 weight percent of the composition.

9. The composition of claim 1, wherein the silicone modified polyacrylate is about 0.5 to about 2 weight percent of the composition.

10. The composition of claim 1, wherein the stabilizer is about 5 to about 50 weight percent of the composition.

11. A composition comprising a metal nanoparticle, a hydroxyl-functional silicone modified polyacrylate compound, a stabilizer and a solvent, wherein the metal nanoparticle and the polyacrylate compound are stably dispersed in the solvent and the stabilizer is physically or chemically associated with the surface of the metal nanoparticle.

12. The composition of claim 11, wherein the metal nanoparticle is selected from the group consisting of silver, gold, platinum, palladium, copper, cobalt, chromium, nickel, silver-copper composite, silver-gold-copper composite, silver-gold-palladium composite and mixtures thereof.

13. The composition of claim 12, wherein the stabilizer is an organoamine stabilizer selected from the group consisting of butylamine, pentylamine, hexylamine, heptylamine, octylamine, nonylamine, decylamine, hexadecylamine, undecylamine, dodecylamine, tridecylamine, tetradecylamine, diaminopentane, diaminohexane, diaminoheptane, diaminooctane, diaminononane, diaminodecane, diaminooctane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine and mixtures thereof.

14. The composition of claim 11, wherein the solvent is selected from the group consisting of water, an isoparaffinic hydrocarbon solvent, a monoterpene alcohol, an alkyl alcohol having from 1 to about 16 carbon atoms, a cyclocarbyl alcohol having from about 5 to about 15 carbon atoms, an alkane having from about 6 to about 16 carbon atoms, an alkyl acetate having from about 3 to about 12 carbon atoms, toluene, xylene, mesitylene, chlorobenzene, dichlorobenzene, cyanobenzene, acetonitrile, N,N-dimethylformamide (DMF), N-methyl-2-pyrrolidone, and combinations thereof.

15. A method of forming conductive features on a substrate, the method comprising:
providing a liquid composition containing metal nanoparticles, a silicone modified polyacrylate compound, a stabilizer and a solvent, wherein the metal nanoparticle and the polyacrylate compound are stably dispersed in the solvent and the stabilizer is physically or chemically associated with the surface of the metal nanoparticle,
depositing the liquid composition onto the substrate to form deposited features, and
heating the deposited features on the substrate to a temperature from about 100° C. to about 200° C. to form conductive features on the substrate.

16. The method according to claim 15, wherein the silicone modified polyacrylate compound is a silicone modified polyacrylate compound with at least one organic functional moiety.

17. The method according to claim 16, wherein the at least one organic functional moiety of the silicone modified polyacrylate compound is selected from the group consisting of a hydroxyl moiety, an epoxy moiety, an amino moiety, an acetyl moiety, a cyano moiety, a halogen moiety, a mercapto moiety, a sulfide moiety, a vinyl moiety, an alkoxyalkyl moiety, a carbamate moiety, a carboxyl moiety, an ester moiety, an aromatic moiety, and an alkyl moiety.

18. The method according to claim 15, wherein the liquid depositing is selected from the group consisting of spin coating, blade coating, rod coating, dip coating, lithography or offset printing, gravure, flexography, screen printing, stencil printing, inkjet printing, and stamping.

19. The method according to claim 15, wherein the conductive features are metal lines having a width of from about 10 microns to about 200 microns.

20. The method according to claim 15, wherein the conductive features are metal lines having a thickness of from about 50 nanometers to about 200 nanometers.

* * * * *